No. 748,009. PATENTED DEC. 29, 1903.
S. C. RAMSEY.
NUT LOCK.
APPLICATION FILED MAR. 21, 1903.
NO MODEL.

Witnesses:
M. E. Harrison
M. Hunter

Inventor.
Samuel C. Ramsey
By O. D. Levis
Attorney

No. 748,009.  Patented December 29, 1903.

UNITED STATES PATENT OFFICE.

SAMUEL C. RAMSEY, OF EVANS CITY, PENNSYLVANIA.

NUT-LOCK.

SPECIFICATION forming part of Letters Patent No. 748,009, dated December 29, 1903.

Application filed March 21, 1903. Serial No. 148,925. (No model.)

*To all whom it may concern:*

Be it known that I, SAMUEL C. RAMSEY, a citizen of the United States, residing at Evans City, in the county of Butler and State of Pennsylvania, have invented a new and useful Improvement in Nut-Locks, of which improvement the following is a specification.

This invention relates to an improved nut-lock; and it consists in the certain details of construction and combination of parts, as will be fully described hereinafter.

Figure 1:
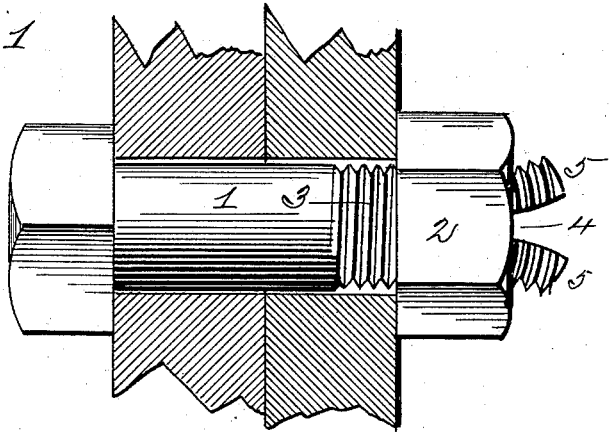
Figure 2:
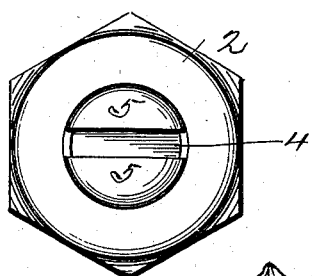
Figure 3:
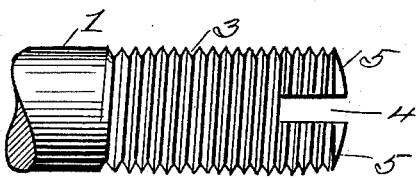
Figure 4:
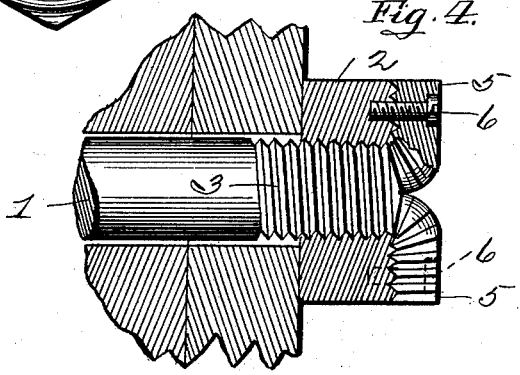

In the accompanying drawings, Figure 1 is a side elevation of a bolt and nut, the said bolt being locked with the nut in accordance with my invention. Fig. 2 is a end elevation of the same. Fig. 3 is a side elevation of the threaded shank of the bolt, showing the cut or slot formed in the end thereof. Fig. 4 is a modified form of my invention.

To construct a nut-lock in accordance with my invention, I provide a bolt 1, having the usual head and threaded shank 3, and form by means of a suitable tool a deep cut or slot 4 diagonally across threaded end of the bolt, the said slot extending rearward some distance.

In operation the nut is screwed on the threaded end of the bolt in the usual manner, and when in the desired position a wedge-shaped tool is inserted in the slot 4 and the ends 5 spread apart, as shown in Fig. 1 of the drawings, thereby locking the nut to the bolt.

At Fig. 4 of the drawings I have shown a modified form of the invention in which the slot or cut 4 is of sufficient depth to admit the ends 5 to be bent at right angles and in close contact with the face of the nut 2. Small annular openings are formed through these ends 5, and a short stud-screw 6 is used to attach the said ends to the nut 2, in which threaded openings are formed, as will be seen in the above-referred-to figure.

Other modifications and changes may be made in the details of construction without departing from the spirit of the invention.

Having thus described my invention, what I claim, and desire to secure by Letters Patent, is—

The herein-described nut-locking device, consisting of the bolt 1, having a slot formed in the threaded end thereof, the nut 2 having threaded openings formed in its front face, the ends 5 of the bolt formed with openings which will register with the openings in the face of the nut, and suitable screws 6, for connecting the ends 5 when bent at right angles to the nut 2, substantially as described.

In testimony whereof I have hereunto signed my name in the presence of two subscribing witnesses.

SAMUEL C. RAMSEY.

In presence of—
M. HUNTER,
K. H. BUTLER.